(12) United States Patent
Lee

(10) Patent No.: US 10,107,234 B2
(45) Date of Patent: Oct. 23, 2018

(54) INSERTABLE FILTER FOR CANISTER AND CANISTER HAVING THE FILTER

(71) Applicant: Hyundai Motor Company, Seoul (KR)

(72) Inventor: Dong-Cho Lee, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 239 days.

(21) Appl. No.: 14/824,708

(22) Filed: Aug. 12, 2015

(65) Prior Publication Data

US 2016/0146160 A1 May 26, 2016

(30) Foreign Application Priority Data

Nov. 26, 2014 (KR) .................. 10-2014-0166257

(51) Int. Cl.
*F02M 25/08* (2006.01)
*B01D 46/24* (2006.01)

(52) U.S. Cl.
CPC ..... *F02M 25/0854* (2013.01); *B01D 46/2403* (2013.01); *F02M 25/089* (2013.01); *F02M 25/0872* (2013.01); *B01D 2265/06* (2013.01)

(58) Field of Classification Search
CPC .......... F02M 25/0854; F02M 25/0872; F02M 25/089; B01D 46/0005; B01D 46/0012; B01D 46/0021; B01D 46/0049; B01D 46/0079; B01D 46/2403; B01D 2259/4516
See application file for complete search history.

(56) References Cited

U.S. PATENT DOCUMENTS

| 2,665,811 | A | * | 1/1954 | Showalter | ........ C10M 175/0008 |
| | | | | | 210/268 |
| 4,951,643 | A | * | 8/1990 | Sato | ................... F02M 25/0836 |
| | | | | | 123/519 |
| 5,266,755 | A | | 11/1993 | Chien | |
| 8,615,995 | B2 | | 12/2013 | Neumann et al. | |
| 2008/0110440 | A1 | * | 5/2008 | Oh | ..................... F02M 25/0854 |
| | | | | | 123/519 |
| 2011/0247592 | A1 | * | 10/2011 | Kim | ................. B60K 15/03504 |
| | | | | | 123/519 |
| 2015/0090611 | A1 | * | 4/2015 | Dolan | ..................... F17D 5/005 |
| | | | | | 206/0.7 |
| 2017/0009707 | A1 | * | 1/2017 | Kuboyama | ........ F02M 25/0854 |

FOREIGN PATENT DOCUMENTS

| EP | 1788230 A1 | 5/2007 |
| JP | 7-217506 A | 8/1995 |
| KR | 20-0274333 Y1 | 5/2002 |
| KR | 10-2008-0052988 A | 6/2008 |
| KR | 10-0956030 B1 | 5/2010 |

* cited by examiner

*Primary Examiner* — Erick Solis
*Assistant Examiner* — Anthony L Bacon
(74) *Attorney, Agent, or Firm* — Morgan, Lewis & Bockius LLP

(57) ABSTRACT

Disclosed are a canister and an insertable filter for a canister which collects fuel evaporation gas and emits the collected fuel evaporation gas to an intake pipe when an engine is purged. The insertable filter includes a pipe configured to be able to penetrate through a case of the canister, and meshes configured to filter foreign materials. The meshes are installed at a portion where an inside and an outside of the pipe are in fluidic communication with each other.

6 Claims, 6 Drawing Sheets

(Related Art)

INSERTABLE FILTER FOR CANISTER AND CANISTER HAVING THE FILTER

CROSS-REFERENCE TO RELATED APPLICATIONS

The present application claims priority of Korean Patent Application Number 10-2014-0166257 filed on Nov. 26, 2014, the entire contents of which application are incorporated herein for all purposes by this reference.

BACKGROUND OF THE INVENTION

Field of the Invention

The present invention relates to a canister storing fuel evaporation gas which is generated when an engine stops and a filter mounted in the canister, and more particularly, to an insert type filter for a canister which is replaceably installed into the canister of the vehicle and is mounted in a form inserted into the canister and a canister having the filter.

Description of Related Art

Fuel evaporation gas is generated from a fuel tank, and the like in a state in which an engine of a vehicle stops. When the fuel evaporation gas is emitted into the atmosphere, air pollution occurs. Therefore, the fuel evaporation gas is stored in a canister which is installed in the vehicle and then is supplied to the engine at the time of an operation of the engine so as to be combusted.

FIG. 1 illustrates a layout of a system for treating fuel evaporation gas of a vehicle in which a gasoline engine is equipped. The fuel evaporation gas generated from a fuel tank 4 is collected in a canister 100 and a purge control solenoid valve (PCSV) 5 which is operated by an electronic control unit (ECU) 8 is opened at the time of a purge of the engine 1. When the PCSV 5 is opened, air introduced from the outside through a vent line 6 by a negative pressure in an intake pipe 2 is supplied to a canister 100 to supply the fuel evaporation gas collected in the canister 100 to the intake pipe 2 and combust the collected fuel evaporation gas in the engine 1. Non-explained reference number 3 is a throttle valve which controls an amount of air introduced into the engine 1 and non-explained reference numeral 7 is an air filter which filters foreign materials included in the air introduced from the outside.

Meanwhile, FIG. 2 illustrates a structure of the canister 100. The canister 100 includes: a case 101 configured to have a barrier rib 102 formed therein; active carbon 103 configured to be filled in the case 101; an air inlet 104 configured to be connected to a vent line 6; a gas inlet 105 configured to be introduced with the fuel evaporation gas from the fuel tank 4; a gas outlet 106 configured to emit the fuel evaporation gas collected in the canister to the intake pipe 2; an upper filter 108 configured to be installed at the air inlet 104, the gas inlet 105, and the gas outlet 106; and a lower filter 109 configured to be elastically supported under the case 101 to prevent the active carbon 103 from flowing.

In accordance with the related art, the upper filter 108 is fused to the inside of the case 101 with an ultrasonic wave and therefore the upper filter may not be replaced later. For example, when the upper filter 108 at the air inlet 104 side is deposited with foreign materials, dust, and the like and thus the air inlet 104 stops, only the upper filter 108 may not be replaced and therefore the overall canister 100 cannot but be replaced.

When the PCSV 5 is opened and purged in a state in which the air inlet 104 side stops by foreign materials, and the like, the negative pressure in the intake pipe 2 is delivered to the fuel tank and thus the pressure in the fuel tank 4 is lower than an atmospheric pressure, such that the fuel tank 4 may be damaged.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

The present invention is directed to an insert type filter for a canister which may replace a filter filtering foreign materials when the canister collecting fuel evaporation gas from a vehicle is deposited with the foreign materials and a canister having the filter.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with various aspects of the present invention, an insertable filter for a canister which collects fuel evaporation gas and emits the collected fuel evaporation gas to an intake pipe when an engine is purged, the insertable filter including: a pipe configured to be able to penetrate through a case of the canister; and meshes configured to filter foreign materials, wherein the meshes are installed at a portion where an inside and an outside of the pipe are in fluidic communication with each other.

A side of the pipe may be formed with a plurality of through holes which fluidly connect the inside and the outside of the pipe and the meshes may include a side mesh disposed at an inner side of the pipe to cover the plurality of through holes, wherein the side mesh is made of a metal mesh.

The side mesh may be wound around the inner side of the pipe, and the portion at which the side mesh is installed in the pipe may be provided with a caulking part to prevent the side mesh from moving in a longitudinal direction of the pipe One or each through hole may be elongated along a longitudinal direction of the pipe.

A front end of the pipe may be formed to be inclined with respect to a longitudinal direction of the pipe. The meshes may include a front mesh disposed adjacent to a front end of the pipe to cover an entire opening of the pipe at the front end.

The pipe may be provided with an air inlet through which outside air is introduced into the canister. The pipe may be made of stainless steel.

In accordance with various other aspects of the present invention, a canister for collecting fuel evaporation gas and emitting the collected fuel evaporation gas to an intake pipe when an engine is purged, the canister including: an insertable filter including a pipe configured to be able to penetrate through a case of the canister, and a mesh configured to filter foreign materials, wherein the mesh is detachably installed in the pipe to cover a plurality of through holes formed in the pipe.

Fuel evaporation gas may be collected in the canister and the insertable filter may be installed at an air inlet through which air is introduced into the canister from an outside when a purge controller solenoid valve is opened.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 4:
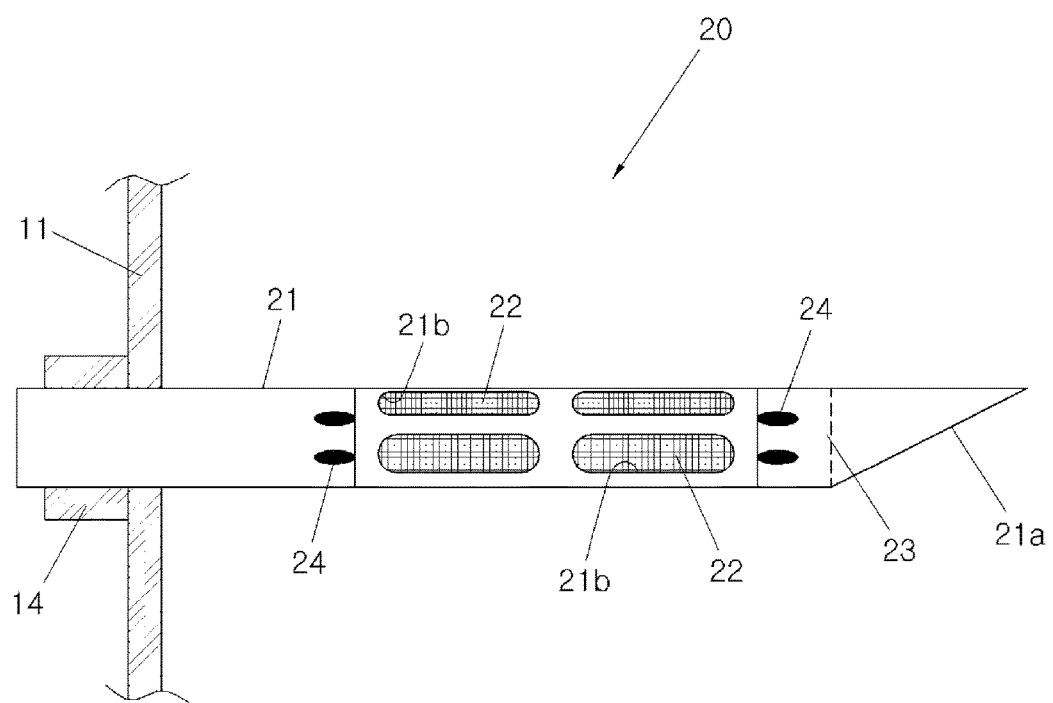
FIG. 4 is a side view illustrating an exemplary insertable filter for a canister in accordance with the present invention.

As illustrated in FIG. 4, the insertable or insert type filter for a canister in accordance with some exemplary embodiments of the present invention is installed in a canister 10 which collects fuel evaporation gas and emits the fuel evaporation gas collected therein to an intake pipe 2 when an engine 1 is purged and includes a pipe 21 configured to be installed to penetrate through a case of the canister 10 and meshes 22 and 23 configured to be installed at a portion of the pipe 21 to filter foreign materials.

First, the canister 10 having an insert type filter in which an insert type filter 20 for a canister is mounted will be described below.

Figure 1:
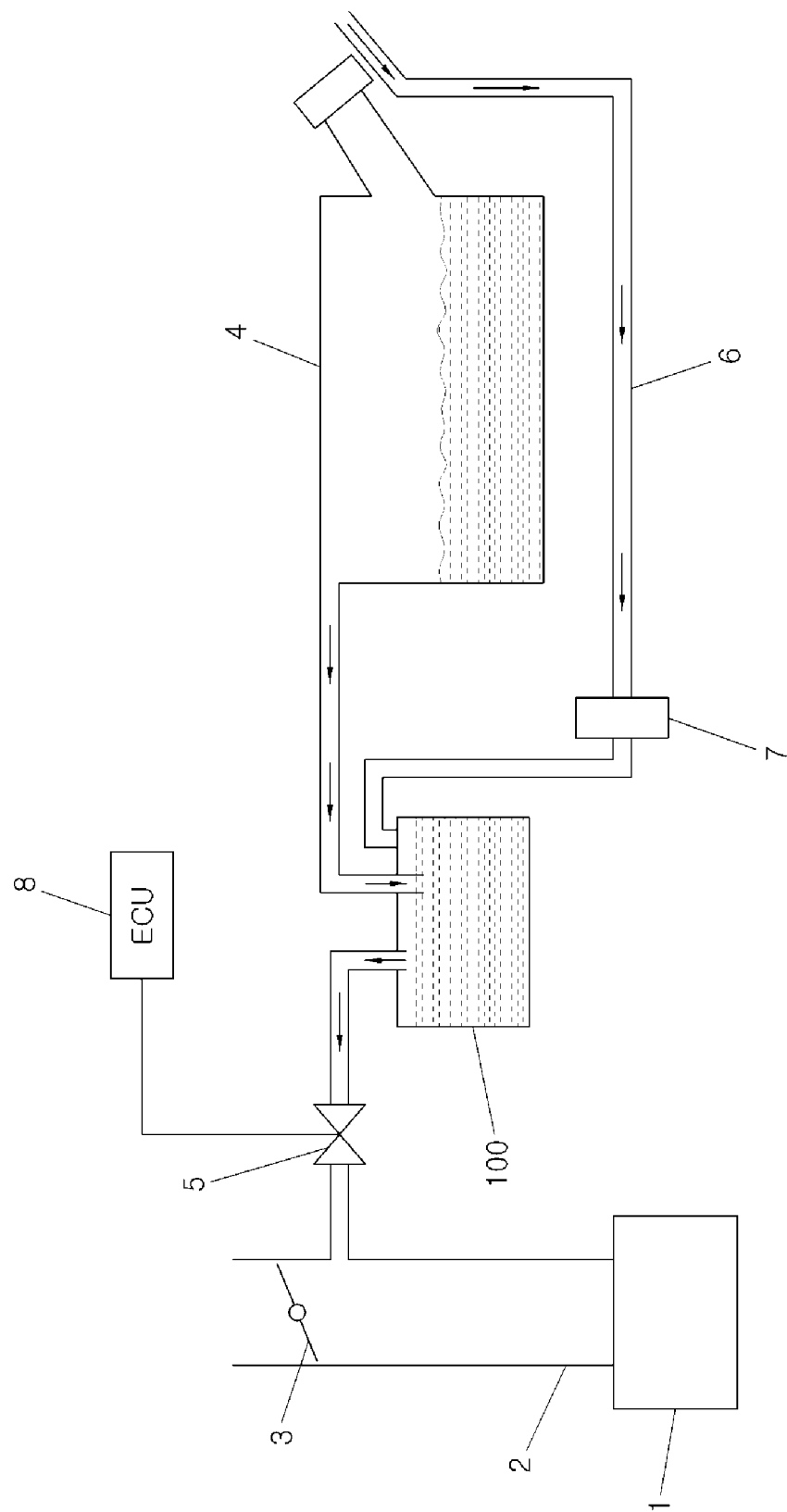
FIG. 1 is a layout of a system for treating fuel evaporation gas in a general vehicle.
Figure 2:
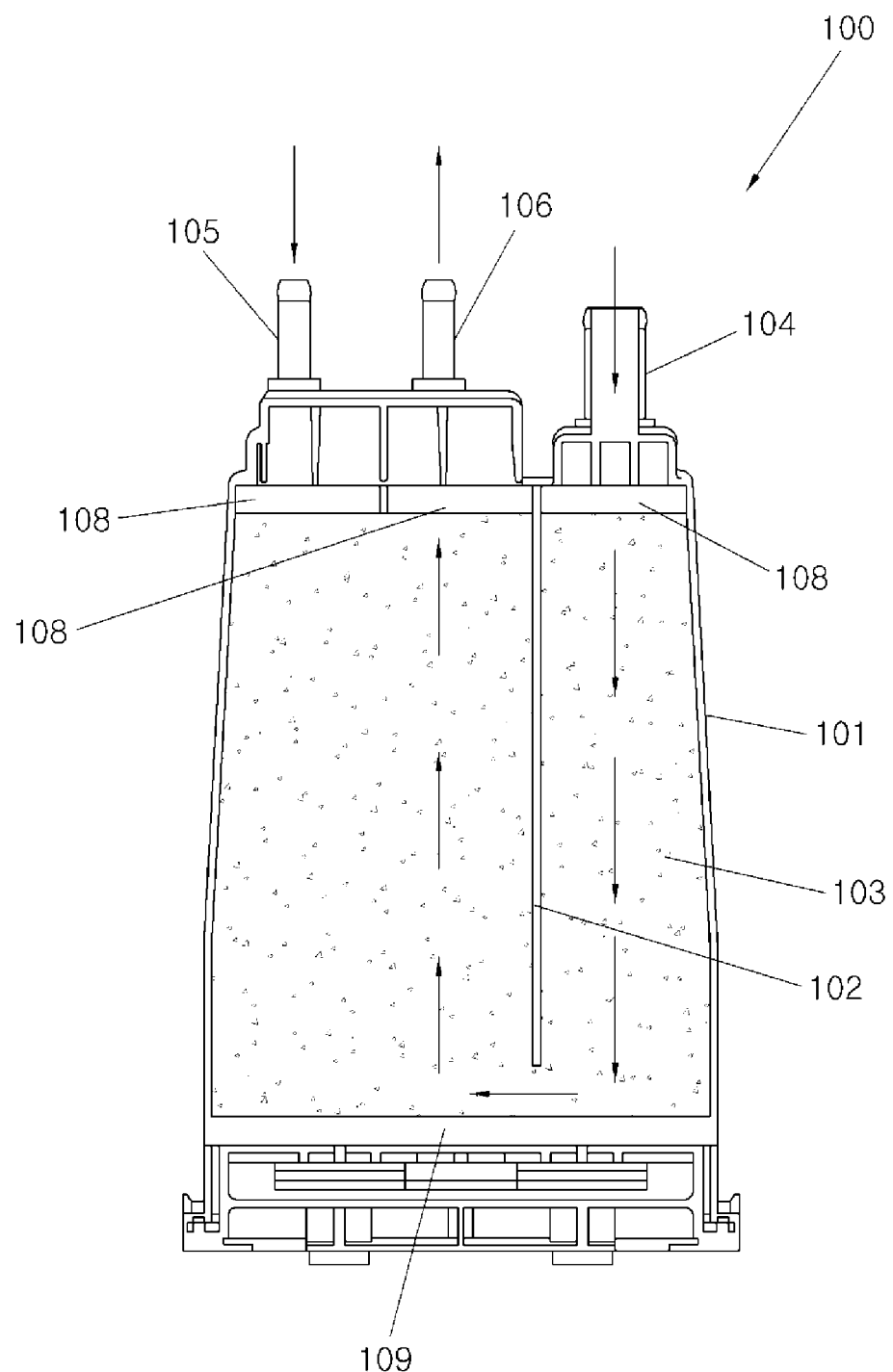
FIG. 2 is a cross-sectional view of a canister in accordance with the related art.
Figure 3:
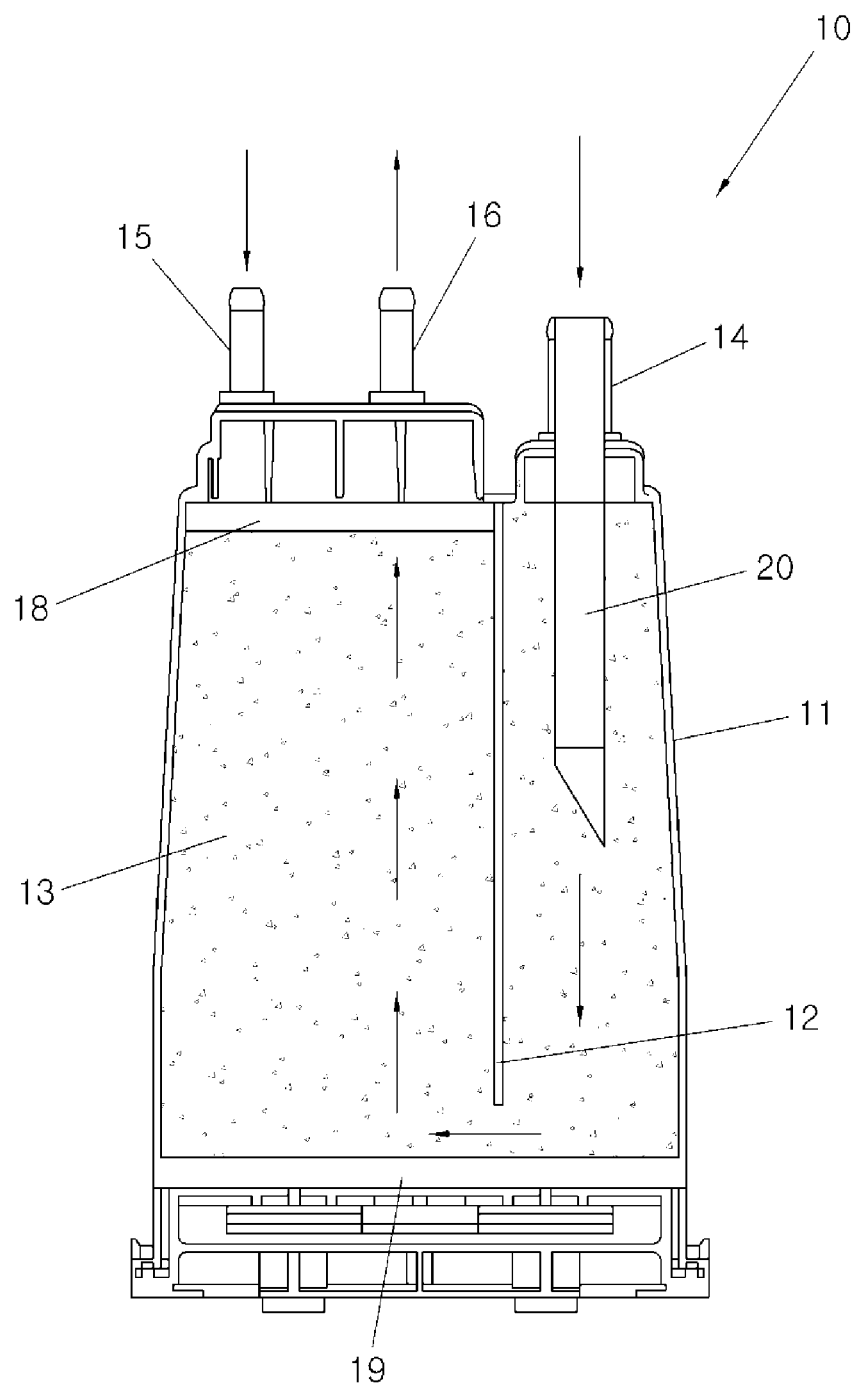
FIG. 3 is a cross-sectional view illustrating a canister having an exemplary insertable filter in accordance with the present invention.

As illustrated in FIG. 3, the canister 10 having an insertable or insert type filter has a space formed therein and an inside of a case 11 in which a barrier rib 12 is formed is filled with active carbon 13. One side of the case 11 is provided with an air inlet 14 configured to be introduced with air from the outside when the engine 1 is purged in the canister 10, a gas inlet 15 configured to be introduced with fuel evaporation gas from a fuel tank 4, and a gas outlet 16 which is a passage through which the fuel evaporation gas collected in the canister 10 is emitted to the intake pipe 2. The gas inlet 15 and the gas outlet 16 are provided with upper filters 18 and a lower portion of the case 11 is provided with a lower filter 19 which is elastically supported by a spring, and the like to prevent the active carbon 13 from flowing.

When the engine is purged in the canister 10 having the foregoing configuration, the insert type filter 20 for a canister may be detached from the air inlet 14 which is the passage through which the air is introduced from the outside and is mounted in a form inserted into the canister 10.

The insertable or insert type filter 20 for a canister includes the pipe 21 and the meshes 22 and 23 which are installed in the pipe 21.

The pipe 21 has an inside formed in a hollow form. By this configuration, when the engine is purged through one end of the pipe 21, that is, when the fuel evaporation gas collected in the canister 10 flows in the intake pipe 2 by the negative pressure of the intake pipe 2 by opening a purge control solenoid valve (PCSV) 5 which is installed in a conduit connecting the intake pipe 2 to the canister 10 so as to be combusted in the engine 1, the outside air is introduced.

In some embodiments, a circumference of the pipe 21 is provided with a plurality of through holes which penetrate through a wall of the pipe 21 so that an inside and an outside of the pipe is fluidly connected to each other. The through hole 21b may be formed in a long hole form and may be disposed along a circumferential direction of the pipe 21 and a length direction of the pipe 21. Further, the through hole 21b may be formed in a defined section in a length direction of the pipe 21 from the pipe 21, wherein a width of the through hole 21b along the circumferential direction is larger than a width of an area where the through hole 21b is not formed on the pipe 21 along the circumferential direction.

To facilitate insertion of the insertable or insert type filter 20 into the canister 10, a front end 21a of the pipe 21 is sharply formed to be easily inserted. That is, the front end of the pipe 21 may be formed to be inclined with respect to the longitudinal direction of the pipe 21. In addition, in some embodiments, the pipe 21 is made of stainless steel or the like, and thus has corrosion resistance.

The meshes 22 and 23 are disposed in the pipe 21 to prevent the active carbon 13 in the canister 10 from being introduced into the pipe 21 and to filter foreign materials included in the air introduced from the outside which are introduced into the canister 10.

The meshes 22 and 23 include a side mesh 22 which is installed at an inside circumference of the pipe 21 and a front mesh 23 which is installed at a portion adjacent to the front end of the pipe 21.

The side mesh 22 is installed at a portion where the plurality of through holes 21b in the pipe 21 are formed and secures the ventilation through the through hole 21b and prevents the active carbon 13 from being introduced into the pipe 21.

Figure 5:
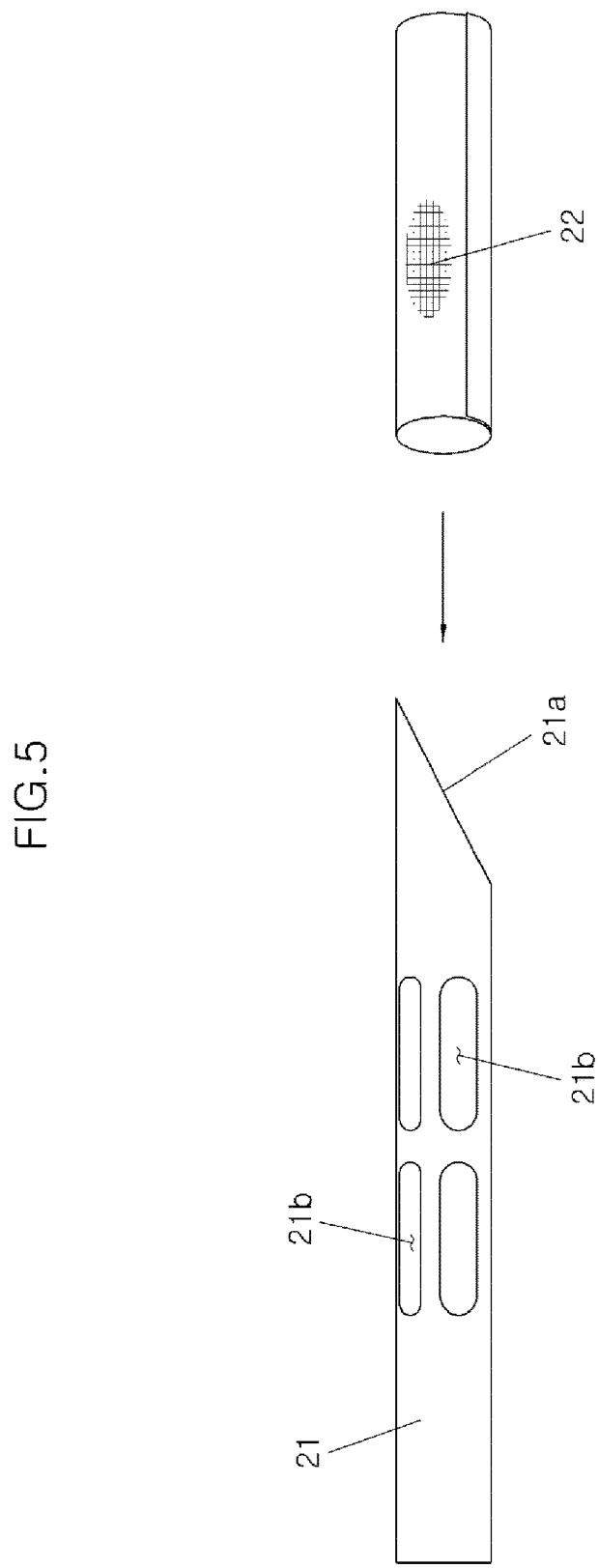
FIG. 5 is an exploded perspective side view illustrating an exemplary insertable filter for a canister in accordance with the present invention.

In one embodiment, a side mesh 22 is cut to correspond to an area of each through hole 21b and installed to cover each through hole 21b. In some embodiments, a side mesh 22 (e.g., a metal mesh) having a defined area and wound in a cylindrical form is inserted into the pipe 21 to cover some or all of the plurality of through holes 21b formed on the pipe 21. As an example, FIG. 5 illustrates a side mesh 22 (e.g., a cylindrical metal mesh) is to be inserted into the pipe 21 to cover each through hole 21b.

In some embodiments, to prevent the side mesh 22 from flowing along the length direction of the pipe 21 after the side mesh 22 is inserted into the pipe 21, the side mesh 22 is inserted and then a portion where both ends of the side mesh 22 are positioned at an outer side of the pipe 21 may be subjected to caulking processing 24.

The front mesh 23 is installed at an adjacent portion to the front end 21a of the pipe 21. When the filter 20 is inserted into the canister 10, the front mesh 23 is installed to prevent the active carbon 13 from being introduced into the pipe 21. The front mesh 23 is installed to cover the entire cross sectional area of the pipe 21.

Figure 6:
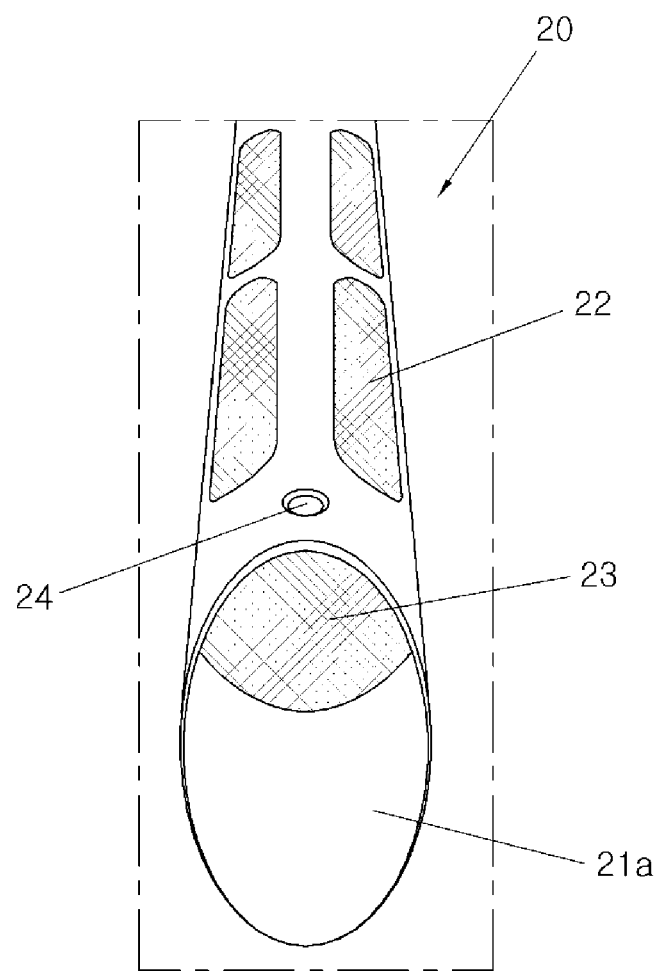
FIG. 6 is a partially enlarged front perspective view illustrating an exemplary insertable filter for a canister in accordance with the present invention.

Therefore, the filter 20 has a form as illustrated in FIG. 6, when viewed from the front end 21a side of the pipe 21.

According to the insert type filter for a canister and the canister having the filter in accordance with some exemplary embodiments of the present invention configured as described herein, when the foreign materials are deposited in the filter 20, the filter 20 is disassembled and then a new filter is mounted, thereby securing the ventilation equivalent to the new canister 10 and semi-permanently using the canister.

Further, it is possible to save the time and costs required to exchange the canister 10 when the foreign material is deposited.

According to the insert type filter for a canister and the canister having the filter in accordance with some exemplary embodiments of the present invention configured as described herein, it is possible to prevent the function defect of the canister due to the deposition of the foreign materials by securing air permeability like a new canister by replacing only the insert type filter inserted into the canister when the foreign materials, dust, and the like introduced from the outside are deposited.

Further, it is possible to semi-permanently use the canister by exchanging the filter and reduce the time and costs required to exchange the canister by exchanging only the filter rather than exchanging the canister at the time of the deposition of the foreign materials.

Further, it is possible to prevent the fuel tank from being damaged due to the pressure difference from the atmosphere by delivering the negative pressure of the intake pipe to the fuel tank as the air inlet of the canister is deposited with the foreign materials, and the like.

For convenience in explanation and accurate definition in the appended claims, the terms "upper" or "lower", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An insertable filter for a canister which collects fuel evaporation gas and emits the collected fuel evaporation gas to an intake pipe when an engine is purged, the insertable filter comprising:
    a pipe configured to penetrate through a case of the canister; and
    meshes configured to filter foreign materials, wherein the meshes are installed at a portion where an inside and an outside of the pipe are in fluidic communication with each other,
    wherein a side of the pipe is formed with a plurality of through holes which fluidly connect the inside and the outside of the pipe,
    wherein one or each through hole of the through holes is elongated along a longitudinal direction of the pipe,
    wherein the through holes are formed along the longitudinal direction of the pipe and an circumferential direction of the pipe, and
    wherein the pipe is provided with an air inlet through which outside air is introduced into the canister.

2. The insertable filter for the canister of claim 1, wherein:
    a metal mesh of the meshes is wound around an inner side of the pipe, and
    a portion at which a side mesh of the meshes is installed in the pipe is provided with a caulking part to prevent the side mesh from moving in the longitudinal direction of the pipe.

3. The insertable filter for the canister of claim 1, wherein a front end of the pipe is formed to be inclined with respect to the longitudinal direction of the pipe.

4. The insertable filter for the canister of claim 3, wherein the meshes include a front mesh disposed adjacent to the front end of the pipe to cover an entire opening of the pipe at the front end.

5. The insertable filter for the canister of claim 1, wherein the pipe is made of stainless steel.

6. A canister for collecting fuel evaporation gas and emitting the collected fuel evaporation gas to an intake pipe when an engine is purged, the canister comprising:
    an insertable filter including a pipe configured to penetrate through a case of the canister, and a mesh configured to filter foreign materials, wherein the mesh is detachably installed in the pipe to cover a plurality of through holes formed in the pipe,
    wherein a side of the pipe is formed with the plurality of through holes which fluidly connect an inside and an outside of the pipe,
    wherein one or each through hole of the through holes is elongated along a longitudinal direction of the pipe,
    wherein the through holes are formed along the longitudinal direction of the pipe and a circumferential direction of the pipe,
    wherein the fuel evaporation gas is collected in the canister and the insertable filter is installed at an air inlet through which air is introduced into the canister from an outside of the canister when a purge controller solenoid valve is opened.

* * * * *